United States Patent [19]

Brown

[11] Patent Number: 5,454,547
[45] Date of Patent: Oct. 3, 1995

[54] SLEEVED SEAL FOR A VALVE

[75] Inventor: Joel R. Brown, Friendswood, Tex.

[73] Assignee: Valve Sales Company, Inc., Houston, Tex.

[21] Appl. No.: 77,465

[22] Filed: Jun. 14, 1993

[51] Int. Cl.[6] .............................. F16K 41/04; F16J 15/18
[52] U.S. Cl. .................... 251/214; 251/266; 251/327; 251/330; 277/105
[58] Field of Search ...................... 251/214, 326, 251/327, 328, 329, 330, 266, 267, 268; 277/105, 106, 112

[56] References Cited

U.S. PATENT DOCUMENTS

| | | | |
|---|---|---|---|
| 1,995,395 | 3/1935 | Mohr | 251/214 |
| 2,925,091 | 2/1960 | Speisman | 251/330 |
| 3,152,786 | 10/1964 | Soderberg et al. | 251/330 |
| 3,162,453 | 12/1964 | Magos et al. | 277/105 |
| 3,162,455 | 12/1964 | Englert et al. | 277/105 |
| 3,175,573 | 3/1965 | Vater | 251/214 |
| 3,257,095 | 6/1966 | Siver | 251/330 |
| 3,262,709 | 7/1966 | Hansen et al. | 277/105 |
| 3,275,290 | 9/1966 | Siver | 251/330 |
| 3,295,856 | 1/1967 | Bredtschneider et al. | 251/214 |
| 3,420,262 | 1/1969 | O'Neill, Jr. | 251/214 |
| 3,982,729 | 9/1976 | Trieini | 251/215 |
| 4,156,529 | 5/1979 | Hafele | 277/105 |
| 4,500,092 | 2/1982 | Uomala et al. | 251/214 |
| 4,509,719 | 4/1985 | Uomala et al. | 251/214 |

Primary Examiner—George L. Walton
Attorney, Agent, or Firm—Gunn & Associates

[57] ABSTRACT

The present invention provides a sleeved seal, as well as the method of installing and machining said sleeved seal. The seal comprises a unitary configuration of a backseat and a sleeve for a stuffing box area, comprising a valve stem bore in communication with a stuffing box area internal to the sleeve seal and a machined backseat and sleeve along the outer diameter of the sleeved seal.

8 Claims, 4 Drawing Sheets

FIG. 5
FIG. 6
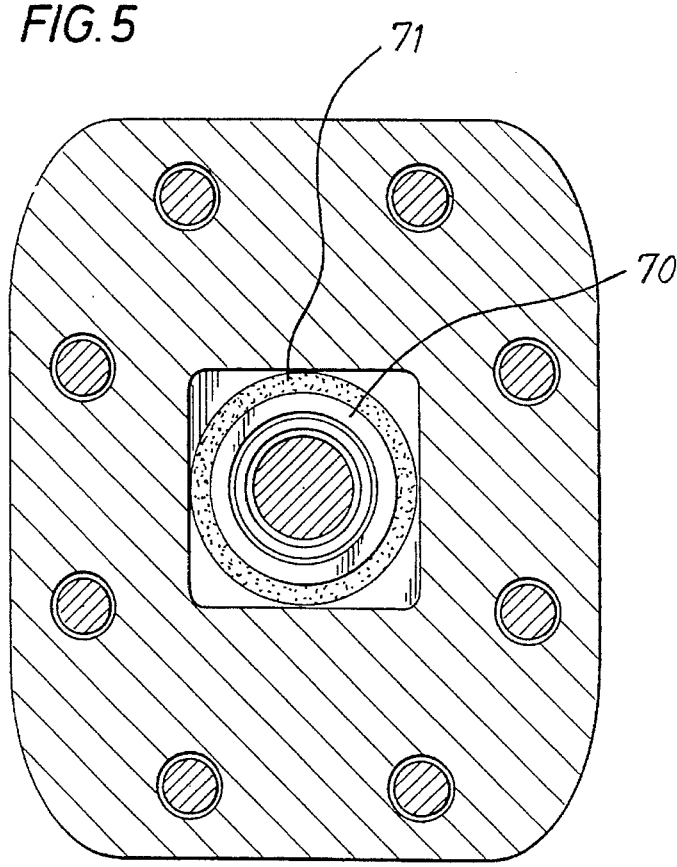
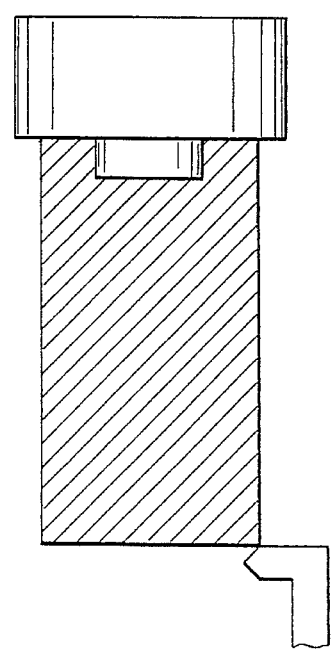
FIG. 7
FIG. 8
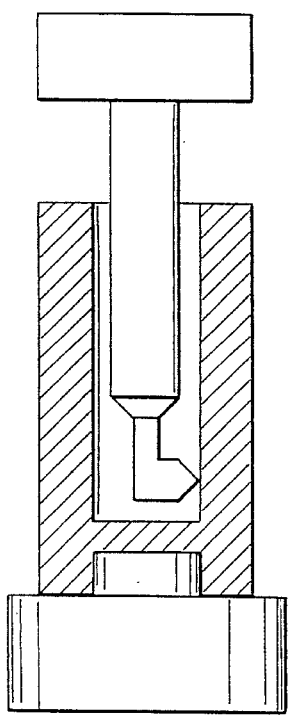
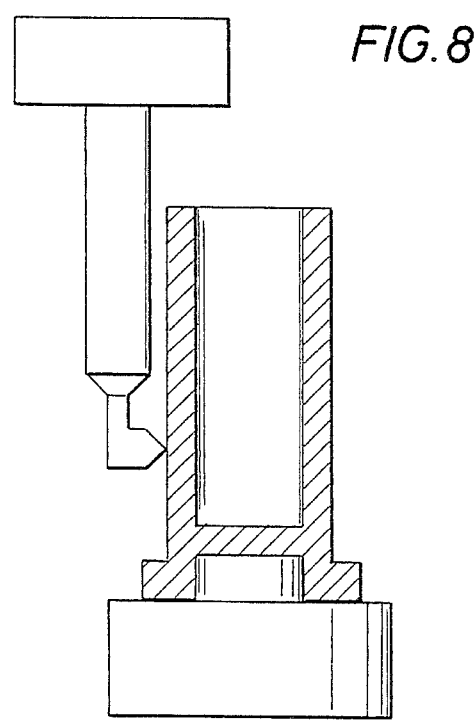

SLEEVED SEAL FOR A VALVE

BACKGROUND OF THE INVENTION

1. Field of the Invention

The present invention relates to a sleeve and backseat configuration in a gate or globe valve and the method of manufacturing and installing that configuration.

2. Description of the Prior Art

In a typical gate valve or globe valve, the area between the bonnet and the stem has traditionally been filled with a packing material that seals the valve at that point. This area that is filled with the packing material, through which the stem of the valve moves in opening and closing the valve, is commonly referred to as a stuffing box. Over time, the stuffing box has been improved to improve the sealing means in that area. For example, U.S. Pat. No. 4,436,283 (Shore) discloses an improved gate valve which is suited for use in a horizontal or lie-down position. In Shore, a wave spring is employed in a gate valve in order to maintain a continuous resilient bias against the upstream seat utilized in the valve. Another improvement made to the seal in the stuffing box area was the addition of a backseat that is typically screwed into the bottom of the stuffing box. U.S. Pat. No. 3,003,744 (Fennema) and U.S. Pat. No. 3,275,290 (Siver) disclose such a backseat construction in a valve. Originally, the backseat was used as a fallback seal, thereby preventing a catastrophic failure of the valve upon failure of the packing material in the stuffing box.

In addition, the backseat itself has been the subject of improvements. U.S. Pat. No. 5,127,629 (Holliday) specifically discloses the improved sealing characteristics of a flexible metal backseat mounted on the valve stem, the set being sufficiently flexible to conform to a valve bonnet sealing surface. The backseat in Holliday engages a beveled portion of the bonnet when the valve is in the closed position.

The prior art does not, however, teach or disclose an extended portion of a backseat that forms a sleeve along the inner surface of a stuffing box. Additionally, the prior art does not teach or disclose any type of sleeve along the inner surface of the stuffing box area as a means of improving the seal and the longevity of the valve. The only known example in the prior art where the material of the stuffing box is different than the valve as a whole is disclosed in U.S. Pat. No. 3,032,310 (Hansen) wherein the stuffing box itself is a separate piece in a fabricated valve. The fabricated valve disclosed in Hansen is typically used in industry as a throwaway valve that cannot be refurbished because each of the fabricated pieces of the valve are typically joined in a manner that does not allow the valves to be refurbished and refitted.

The need to provide an even better seal in the stuffing box area has arisen as a result of increasingly stringent requirements regarding "fugitive emissions." Fugitive emissions are the result of leaks that occur at random points in valves, pipe joints, and unit operations through which fluids (gases and liquids) are transferred or stored. Generally, these types of emissions are prevalent in the stuffing box of a gate or globe valve because of the corrosion of the inner lining of the stuffing box. When the stem is raised or lowered in the operation of a valve, it will carry some of the product along the stuffing box and come in contact with the packing material therein. Over time, the corrosive nature of the material will cause pitting in the stuffing box as well as attack the packing material itself.

In the valve industry, there is a large domestic and international market for reworked and refitted valves in addition to the market for new valves. These valves are usually obtained when they are taken out of service and sold for scrap. They are also scavenged from old plants that are taken out of service altogether. The stuffing box of the used valves is almost always a problem area to refit because of damage due to corrosion. With the newly enacted, more restrictive, parameters for fugitive emissions under the recently amended Clean Air Act, there is also an urgent need to find a way to refit the used valves in a manner that allows these valves, once reworked and refitted, to meet the new requirements of the Act.

Because of the new strict federal regulations regarding fugitive emissions, there is an immediate need for a cost effective solution to containing such emissions in new, as well as reworked and refitted, gate and globe valves. The stuffing box area is the primary area where these emissions occur in gate and globe valves. The present invention solves this urgent problem by negating the corrosion that occurs in the inner lining of the stuffing box area while providing a better overall primary seal. It thereby virtually eliminates fugitive emissions from this problem area. In addition, the present invention provides a means for allowing reworked and refitted valves to meet the same standards under the Clean Air Act as new valves. That result for used valves would be virtually impossible, and, at a minimum, prohibitively expensive using current techniques in the valve refitting and refurbishing industry. The present invention therefore has the environmental benefit of allowing used valves to be refurbished to allow virtually no fugitive emissions. It also, by enabling the continued use by industry of refitted and refurbished valves, provides an additional environmental benefit because these reworked or refitted valves would otherwise find their way into landfills under the new Clean Air Act.

SUMMARY OF THE INVENTION

The present invention provides an improved sealing means in the stuffing box of a new or refitted gate or globe valve that virtually eliminates the possibility of fugitive emissions in that area. It also includes the method of installing the sealing means as well as the making of the improved sealing means on a programmable metal lathe.

Generally, the present invention will be fitted (or refitted) into a typical gate valve which includes a body which has a cylindrical gate chamber bored thereto from one side of the body, and a fluid flow passageway of cylindrical cross section bored through the body in a direction normal to the gate chamber. The cylindrical gate chamber is closed by a closure element (or plate) secured to one side of the body, and a gate is reciprocally mounted in the gate chamber for reciprocation in a direction normal to the axis of the fluid flow passageway bore. The gate is connected to an elongated stem which projects through a valve bonnet slidably mounted through the valve body on the opposite side thereof, and this forms from the valve closure plate. The bonnet has a flanged inner end which bears against a shoulder in the valve body and is sealed against the valve body by an O-ring placed around the internal bonnet flange. Outside of the valve body, the exterior of the bonnet is threaded to receive a retaining nut which threads along the bonnet until it contacts the exterior of the valve body.

The present invention is an article of manufacture comprising a valve with a sleeved seal means further comprised of a unitary backseat and elongated sleeve that may be press fitted or screwed into the stuffing box and backseat area of a typical gate valve or globe valve. Internal to the sleeved seal means is a stuffing box that may be machined to a customized depth and a valve stem bore. The design and method of making the present invention allows the stuffing box area and the valve stem bore to be optimized for any particular application. The invention also encompasses the method of installing the article of manufacture in new or used valves, as well as the method of manufacturing the article of manufacture using a programmable metal lathe.

Generally, the article is comprised of a cylindrical body having a flanged end that acts as a backseat and an elongated end that acts as a sleeve. The backseat portion of the cylindrical body is machined such that it fits into a valve bonnet sealing area. The sleeve portion of the cylinder is generally narrower and extends in a manner that allows it to tightly engage the inner wall of the stuffing box in the bonnet.

Although the present invention is typically machined from a single-piece of material and is typically manufactured in a unitary configuration, it may be constructed as two or more pieces, e.g., a backseat element and a sleeve element threaded or spot or seal welded together.

A primary use of the seal means of the present invention will be through the refitting or refurbishing of used valves and valves that are defective when originally manufactured. For example, a used valve that is taken out of service will often require that the stuffing box and backseat area be purged and remachined. The damage to the area is often in the form of corrosion, which creates leaks around the stuffing box and the backseat. In new valves, it is commonly discovered that the valve stem and the bonnet bore will not be adequately matched to acceptable tolerances. The valve stem bore in the seal means of the present invention can easily be machined to closer tolerance with the outer diameter of the valve stem. Such valves can be refurbished using the present invention by disassembling the valve, boring out or otherwise preparing the bonnet bore for the fitting of the present invention, machining the present invention to the appropriate specifications and tolerances, fitting the sleeved seal means of the present invention into the bonnet bore, and reassembling the valve.

The valve will usually be disassembled by removing the bonnet and then removing the existing packing material, the valve stem, and the existing valve backseat from the valve body. The bonnet bore can be machined using several methods commonly known in the art. If the diameter of the bonnet bore is such that it cannot be bored any further without compromising the integrity of the bonnet or for some other design constraint, the bonnet bore may be filled and rebored to an acceptable size. The seal means will commonly be prepared on a metal lathe. The new regulations regarding fugitive emissions in the Clean Air Act require very tight tolerances between the backseat and the sleeve with the bonnet bore and between the valve stem and the valve stem bore. In order to meet these tolerances and in order to do so in a commercially reasonable manner, a programmable metal lathe will often be used.

Although there are several programmable metal lathes on the market, the method of the present invention is especially adaptable to the Mazak Quick Turn 28N. The metal lathe comprises a spindle, a means to turn the spindle, various cutting and boring tools, and a programmable microprocessor for entering methods of automatically lathing materials to very high tolerances. A bar stock, typically made out of stainless steel or some other non corrosive or wear resistant material, is mounted to the spindle. The microprocessor is programmed to control the lathing of the bar stock into the device of the present invention, and the turning means then rotates the spindle. The first step of the metal lathe is to face off (or cut) a straight surface on the bar, which also normalizes the outer surface of the bar stock to an internal reference point in the microprocessor. The bar stock is then center drilled inside the edge of the bar stock. A hole is bored in the center of the bar stock to the depth of a shoulder of a stuffing box. An outside diameter is lathed to form the sleeve portion of the present invention. The inside diameter of the stuffing box is formed and a shoulder is formed by beveling the end of the stuffing box, thereby defining the bottom of the stuffing box. The back side of the bar stock is then faced off, which again provides an internal reference point to the microprocessor. The outside diameter of the backside of the bar stock is then turned (or lathed) to form the backseat portion of the present invention. A first and second inner diameter chamfers are drilled into the backside of the bar stock and the inner diameter of a valve stem bore is drilled though to the stuffing box.

It is an object of this invention to provide new gate valves and globe valves with a more effective seal means in the stuffing box area of those types of valves.

A further object of the invention is to provide refitted and otherwise refurbished gate valves and globe valves with a more effective sealing means in the stuffing box area.

A further object of the invention is to retard the corrosion that typically occurs in the stuffing box area of a gate valve or globe valve due to the migration of fluids into the stuffing box during the operation of the valve.

A further object of the invention is to minimize the total volume of the stuffing box.

A further object is to allow new, as well as refitted and refurbished valves, to meet the new, more stringent requirements for fugitive emissions under the recent amendments to the Clean Air Act.

A further object is to create a more effective backseat seal by keeping fugitive emissions from escaping through the area between the backseat and the bonnet.

A further object is to allow used valves to be refitted and refurbished such that those valves meet the new, more stringent requirements under the Clean Air Act.

A further object is to remove and replace the lining of a stuffing box that has been corroded due to exposure to corrosive or caustic environments.

A further object is to allow the stems and stuffing boxes to be machined to closer tolerances and more closely matched, thereby providing a still more effective seal in the stuffing box area.

A further object is to create an optimum stuffing box area for each application, thereby minimizing the packing material required.

These and other features and advantages of the present invention will become more apparent to those skilled in the art when considered in light of the following description.

BRIEF DESCRIPTION OF THE DRAWING

FIG. 5 is a bottom view of the bonnet of a typical gate valve or globe valve in which the present invention has been installed.

FIGS. 6–12 is a series of diagrams showing the manufacturing steps involved in creating the present invention on a metal lathe.

DETAILED DESCRIPTION OF A PREFERRED EMBODIMENT

Figure 1:
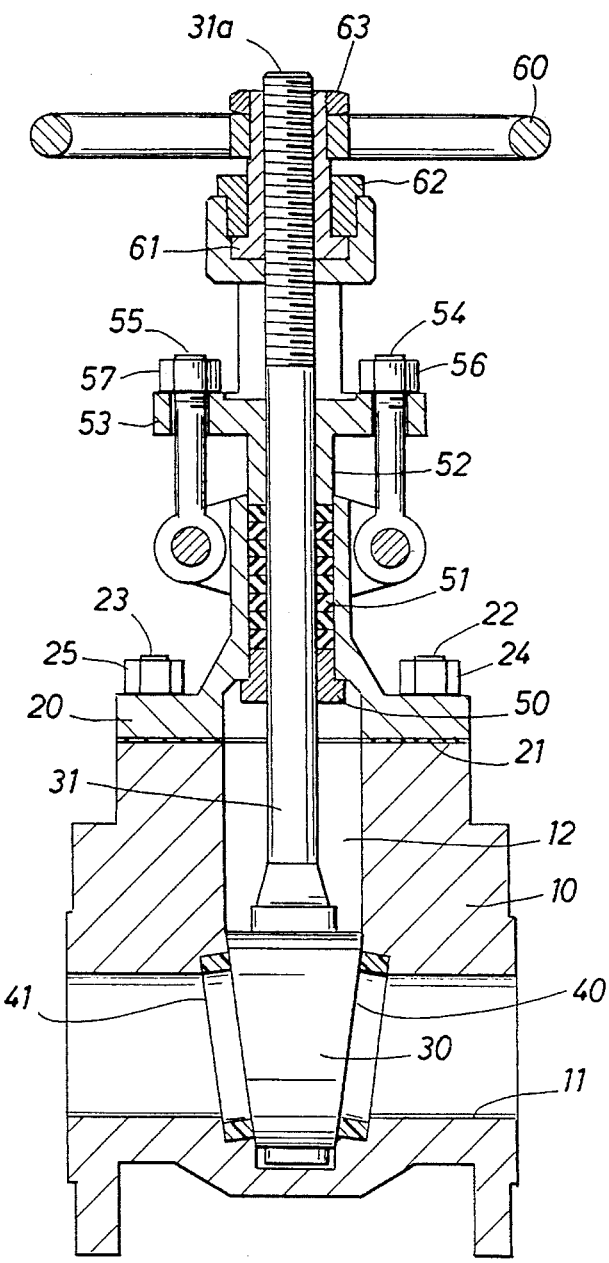
FIG. 1 is a sectional view taken along line 1—1 of a view of a typical cast steel gate valve prior to the installation of the present invention.

FIG. 1 is a cast steel gate valve which comprises a valve body (10) defining a passageway (11) and an intersecting gate chamber (12). The valve further comprises a bonnet (20) which is sealed to the valve body (10) by a bonnet gasket (21) and is held in place by a fixing means, in this case a first and second body bonnet stud bolts (22 and 23) and a first and second body bonnet stud bolt nuts (24 and 25). The valve has a slidably mounted closure member (or disc) (30) which is attached to a valve stem (31) and which is held in place in the closed position by a first and second seatings (40 and 41). The valve stem (31) is mounted slidably within the bonnet (20) and is held in place by a backseat (50) and a packing material (51). The packing material (51) is held in place by a fixing means, which in this case is a configuration consisting of a gland (52), gland flange (53), first and second gland eyebolts (54 and 55), and first and second gland eyebolt nuts (56 and 57). The upper end of the valve stem (31a) is mounted into a hand wheel (60) and yoke (61) configuration used to raise and lower the valve stem. This configuration is completed by the presence of yoke nut retaining nut (62) and a hand wheel nut (63).

Figure 3:
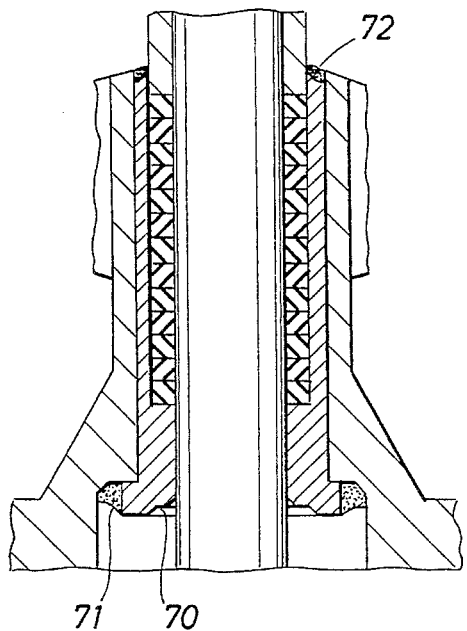
FIG. 3 is a sectional side view taken along line 3—3 of a gate valve after the installation of the present invention wherein the present invention was installed by being press fit and subsequently seal welded into place.
Figure 4:
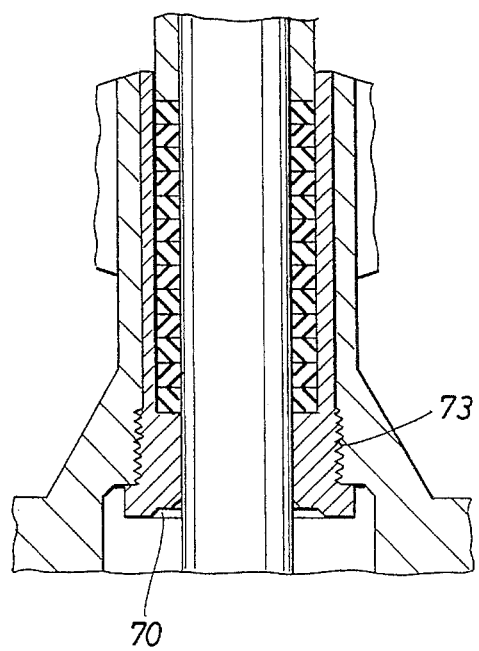
FIG. 4 is a sectional side view taken along line 4—4 of a gate valve after the installation of the present invention wherein the present invention was installed by being screwed into place.
Figure 2:
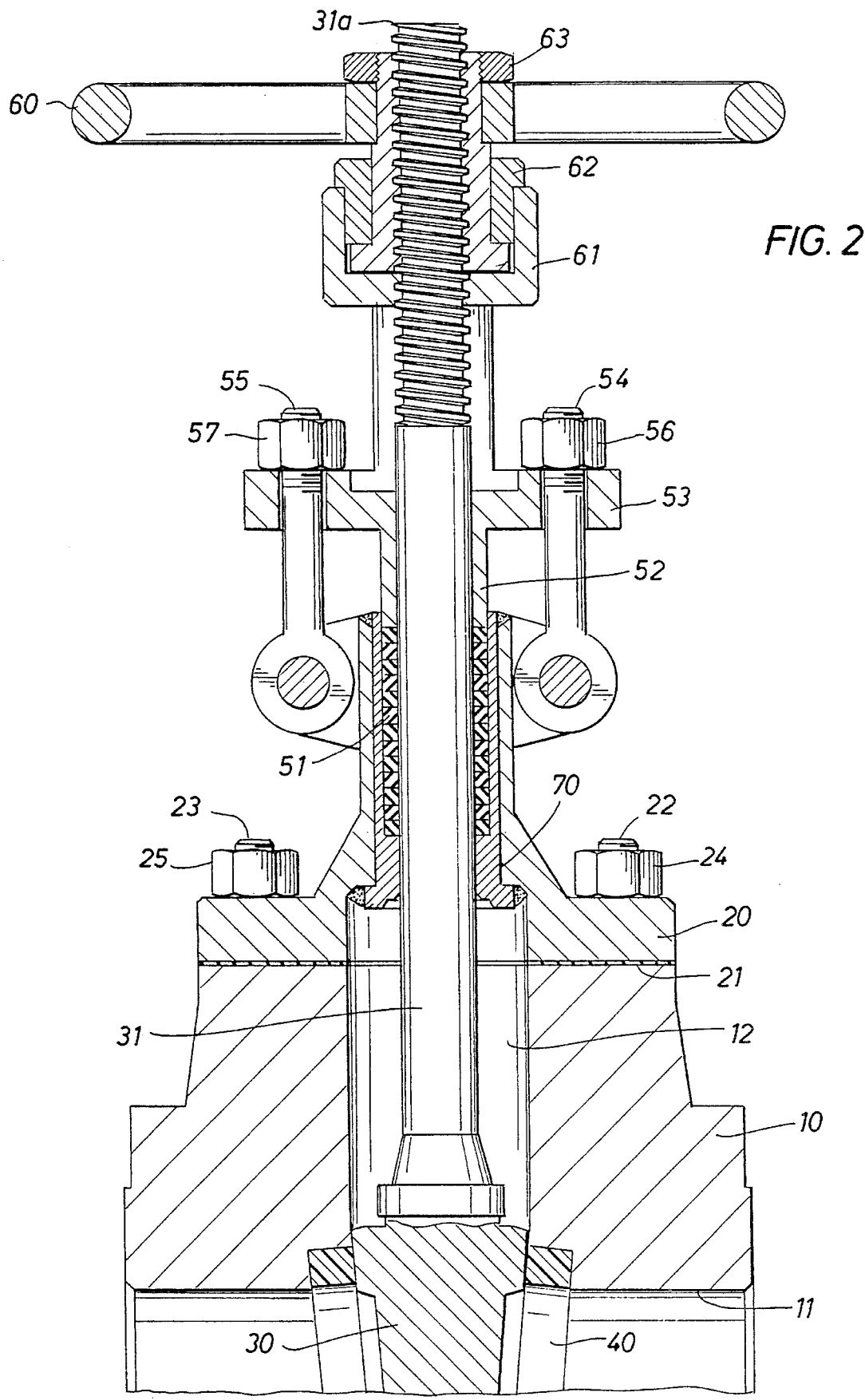
FIG. 2 is a close-up of the sectional view of FIG. 1 taken along line 2—2 of a view of a typical cast steel gate valve after the installation of the present invention.

The installation of the present invention can best be seen in FIG. 2, which is a close-up view of section 1, wherein the packing material and backseat have been removed from the gate valve of FIG. 1. In their place, the present invention, consisting of a unitary backseat and stuffing box sleeve (70) is in place. The present invention will be primarily installed in two ways. FIG. 3 is a representation of the present invention being installed by being press fitted and then seal welded into place. The sleeved seal means (70) is press fitted into the stuffing box and then seal welded (71) to the bonnet or a backseat base. As shown in FIG. 3, depending upon the application, the sleeve seal means (70) may also be seal welded at the top of the sleeve seal means as well (72). FIG. 4 shows the sleeve seal means installed in the other primary way of installing the present invention. The sleeve seal means is held in place by the threads (73) engaging the inner bore of the bonnet.

FIG. 5 is a bottom view of an installed seal means in the bonnet of a typical valve gage. It shows the seal weld (71) as well as the valve bore and a beveled seat for the valve closure member in the fully opened positioned.

Figure 9:
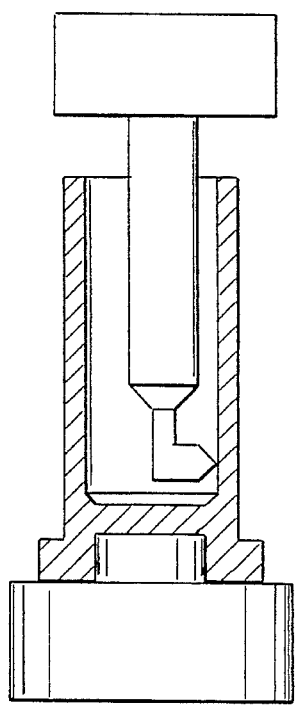
Figure 10:
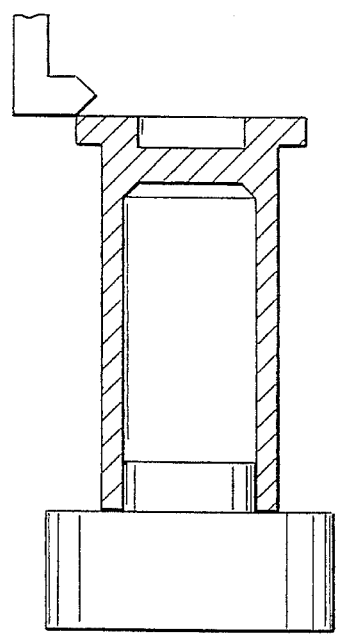
Figure 11:
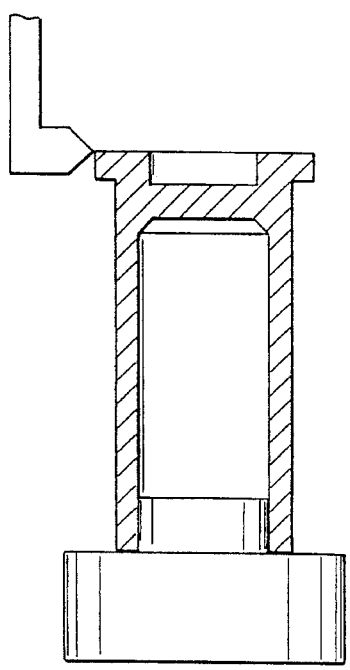
Figure 12:
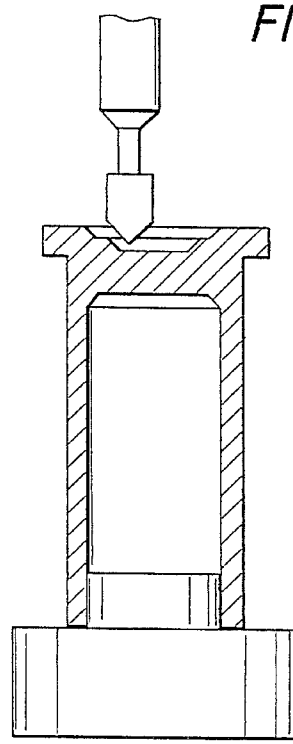

FIGS. 6 through 12 are representation of the steps taken in lathing the present invention from a piece of bar stock. FIG. 6 represents the bar stock mounted on the lathe being faced off with a straight surface whereby the microprocessor is given a base line. FIG. 7 shows the drilling of an internal bore through to a shoulder depth of a stuffing box area. FIG. 8 shows the lathing of the outer diameter of the sleeved portion of the sleeved means. FIG. 9 shows the boring of the inner diameter of the stuffing box area and the creation of the shoulder of the stuffing box area for beveling of the shoulder area. FIG. 10 shows the facing off the back side (or backseat portion) of the sleeved seal means. FIG. 11 is then a representation of the turning of the outside diameter of the backseat portion of the sleeved seal means. FIG. 12 shows the final step of cutting the valve bore inner diameter through to the stuffing box area and the cutting of the first and second inner diameter of the chamfers.

Although the foregoing preferred embodiment description is that of a rising stem gate valve, it should be understood that the present invention can be employed in valves with non-rising stems and in choke valves.

Although the best mode contemplated for carrying out the present invention has been herein shown and described, it will be apparent that modification and variation may be made without departing from what is regarded to be the subject matter of the invention.

I claim:

1. A non-fabricated valve comprising:
   a) a valve body defining:
      (i) a gate chamber;
      (ii) a passageway for fluid flow in communication with the gate chamber; and
      (iii) a valve seat;
   b) a valve element in the gate chamber mounted for movement between open and closed positions, said valve element having a backseat portion disposed thereon;
   c) a valve bonnet interconnected and secured to the valve body having a bonnet bore in communication with the gate chamber, wherein the bonnet defines an annular sealing surface to seal the bonnet to the body;
   d) a sleeved seal member received in the bonnet bore and defining a valve stem bore, valve bore, a stuffing receptacle and a backseat surface thereon, the sleeved seal member terminating intermediate the interconnection of said valve bonnet with the bonnet bore and the interconnection of the valve bonnet with the valve body wherein the sleeved seal member is sized and interchangeable to refit various types of non-fabricated valves of various sizes and dimensions and thereby minimizing fugitive emissions from escaping through an area between the backseat and the bonnet and between the valve stem, the stuffing box and the valve stem bore; and
   e) a valve stem, actuable in said valve body, connected to the valve element, and extending through the valve stem bore and the stuffing receptacle, whereby moving the gate valve from a closed position to a fully opened position when the backseat portion engages the sleeve seal member backseat surface thereby preventing fugitive emissions and fluid leakage.

2. A valve according to claim 1 wherein:
   a) the sleeved seal member defines a unitary backseat and sleeve; and
   b) the bonnet bore defines a counterbore for receiving the backseat of the sleeved seal member.

3. A valve according to claim 1 wherein the sleeved seal member is press fit into the bonnet bore.

4. A valve according to claim 3 wherein the sleeved seal member is welded into place.

5. A valve according to claim 1 wherein the sleeved seal member is threaded along its out diameter and the bonnet bore is threaded along its inner diameter.

6. A valve according to claim 5 wherein the threads along the outer diameter of the sleeved seal member and the inner diameter of the bonnet bore are threaded with about four or five threads.

7. A valve according to claim 1 wherein the sleeved seal member is constructed of a wear resistant, non-corrosive material.

8. A valve according to claim 1 wherein the sleeved seal member is shaped to receive the valve element when the valve is in the open position.

* * * * *